(No Model.)
G. W. HARRINGTON.
MOLD FOR LINING UNIONS.
No. 536,344. Patented Mar. 26, 1895.
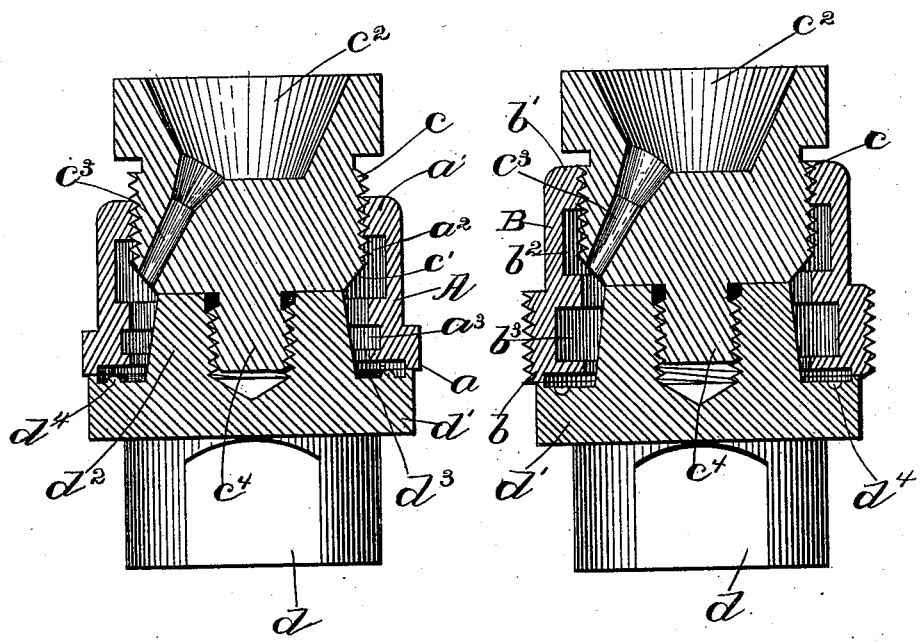
WITNESSES
Charles V. Crocker
John N. Morrison
INVENTOR
George W. Harrington
by B. J. Noyes
atty

UNITED STATES PATENT OFFICE.

GEORGE W. HARRINGTON, OF WAKEFIELD, MASSACHUSETTS, ASSIGNOR TO THE NEW ENGLAND WATER PIPE COMPANY, OF SAME PLACE.

MOLD FOR LINING UNIONS.

SPECIFICATION forming part of Letters Patent No. 536,344, dated March 26, 1895.

Application filed August 24, 1894. Serial No. 521,200. (No model.)

*To all whom it may concern:*

Be it known that I, GEORGE W. HARRINGTON, of Wakefield, county of Middlesex, State of Massachusetts, have invented an Improvement in Molds for Lining Unions, of which the following description, in connection with the accompanying drawings, is a specification, like letters on the drawings representing like parts.

This invention has for its object to construct an apparatus or mold for forming a lining or coating upon the interior of a pipe fitting, such for instance as a union, being a two-part fitting, each part of which has an abutting flange.

Each part of the union is made with an inwardly extended flange or rib at its outer end, having internal screw threads formed thereon, and next to said flange, as well as near the opposite end of the part or section an annular recess is formed, in which the material of the lining may enter, said lining being thereby more firmly held in place. The externally screw threaded plug is screwed into each part of the union, its inner screw threaded end portion projecting beyond the flange, and a base plug is screwed or otherwise secured to the aforesaid plug, bearing upon or against the abutting flange of the union.

The parts are thus held firmly in position by screwing one of the plugs into the fitting, and screwing the other plug onto the aforesaid plug. One of the plugs, as for instance, the externally screw threaded one, has a hole or passage through it for the molten material of which the lining is composed, and is therefore herein designated as the "pouring" plug. The inner face of the flange of the base plug is counter-sunken, or has formed in it a shallow annular recess, so that the lining formed within the union will be made to project slightly beyond the abutting face thereof, and in said annular recess, upon one of the parts, a narrow annular projection or rib is formed, and in the annular recess of the other part a narrow annular recess is formed adapted to receive said projection.

If the parts of the union are made devoid of the annular recesses, as they may be, then a smooth bore will be formed from end to end, and the inner ends of the mold or plug will be made smaller; and also if the inner end of the externally screw threaded pouring plug should not project beyond the flange, then in such case no screw threads will be formed upon the lining, but as both of these features are very desirable I prefer to employ them.

The two parts of the union are operated upon or lined separately.

Figure 1, shows in vertical section one half of the union with the plugs in position therein to form the lining, and Fig. 2, a similar vertical section of the other half of the union.

The union herein represented consists of two halves or sections A, B, each having at one end an abutting flange $a$, $b$, respectively, at the other end an inwardly extended screw threaded flange $a'$, $b'$, respectively, and in each part or section adjacent the ends thereof annular recesses $a^2$, $a^3$, $b^2$, $b^3$. While this form of union presents interiorly a desirable surface to be lined, yet so far as my invention is concerned, it may be otherwise formed.

An externally screw threaded plug $c$ is screwed into the upper end of the union, its inner end portion projecting beyond the flange $a'$, and being tapered as at $c'$ if desired. This plug has a hole or passage through it, herein represented as formed as a recess $c^2$, from the lower end of which leads diagonally a passage $c^3$, communicating with the interior of the union. The molten metal of which the lining is composed is introduced through this passage in the pouring plug. A plug $d$ having a flange $d'$ at one end and a tapered central portion $d^2$, made smaller in diameter than the interior of the union, is introduced at the opposite end of the union, its flange $d'$ bearing against the abutting flange of the union.

The plugs $d$ and $c$ are herein represented as not only abutting together, but are connected together, that is to say, the plug $d$ is connected to the plug $c$, as a simple way of supporting it. The connection is herein shown as made by forming a female threaded socket in the abutting face of the plug $d$, which receives a threaded projection $c^4$ on the abutting face of the plug $c$.

In introducing the plugs into the union, when constructed in the particular way herein shown, the plug c will be screwed in a short distance. Then the plug d will be introduced and screwed onto the plug c, until the inner ends of said plugs abut against each other, and then the plug c is turned backward with the plug d thereon until the flange d' is brought up against the abutting flange of the union. The inner face of the flange d' of the base plug is recessed annularly as at $d^3$, to form upon the lining an annular projection extending beyond the face of the abutting flange. As it is desirable to form upon said annular projecting portion of the lining of one part of the union an annular recess, and upon the other a rib to enter said recess, the recessed face of the flange d' of one of the plugs will be provided with an annular rib and the other part with an annular recess as represented in the drawings.

The lining when formed within the union and the molds or plugs withdrawn, will have in addition to other features, screw threads in continuation of the screw threads formed upon the inwardly extended flanges a', b'.

I do not desire to limit my invention to the employment of all the features herein described, as some of them may be omitted and still a good and efficient lined union produced.

I claim—

1. A union section having an inwardly extended screw threaded flange at one end, combined with an externally screw threaded plug, screwed into said section, its threaded portion projecting inward beyond the flange, and a base plug, made smaller in diameter than the internal diameter of the section, introduced at the opposite end thereof, and having an outwardly projecting flange, said plugs abutting against each other endwise, and one of them having a passage through it for the molten metal, thereby forming a mold around which the metal is poured to produce a lining within the section with a screw threaded portion at one end in continuation of the screw threads of the flange thereof, substantially as described.

2. A union section, internally screw threaded at one end, combined with an externally screw threaded plug screwed into said section, and a base plug made smaller in diameter than the internal diameter of the section, and introduced at the opposite end thereof, and having an outwardly projecting flange, said plugs abutting against each other endwise, and one of them having a passage through it for the molten metal, substantially as described.

3. A union section, internally screw threaded at one end, combined with an externally screw threaded plug screwed into said section, and a base plug made smaller in diameter than the internal diameter of the section, and introduced at the opposite end thereof, and having an outwardly projecting flange, said plugs being connected together, and one of them having a passage through it for the molten metal, substantially as described.

4. A union section having at one end of its bore the inwardly extended screw threaded flange, combined with an externally screw threaded plug screwed into said section, its threaded portion projecting into the bore beyond the flange, and a flanged base plug, made smaller in diameter than the internal diameter of the section to leave an annular recess, in open communication with the annular recess around the projecting end of the screw threaded plug, and a pouring passage for the molten metal, substantially as described.

5. A union section, having an inwardly extended screw threaded flange at one end, combined with an externally screw threaded plug screwed into said section, and a base plug introduced at the opposite end of the section, one of said plugs having at its inner end a screw threaded projection, and the other a screw threaded socket to receive it, thereby connecting them together, and one of said plugs having a passage through it for the molten metal, substantially as described.

6. A union section, internally screw threaded at one end, combined with an externally screw threaded plug screwed into said section, and a flanged base plug at the opposite end of the section having an annular recess $d^3$ upon the inner face of its flange, one of said plugs having a passage through it for the molten metal, substantially as described.

7. A union section, internally screw threaded at one end, combined with an externally screw threaded plug screwed into said section, and a flanged base plug, having an annular recess $d^3$ formed upon the inner face of its flange, and an annular formation in said recess $d^3$, one of said plugs having a passage through it for the molten metal, substantially as described.

In testimony whereof I have signed my name to this specification in the presence of two subscribing witnesses.

GEORGE W. HARRINGTON.

Witnesses:
EDW. C. STORROW,
B. J. NOYES.